Figure 1:
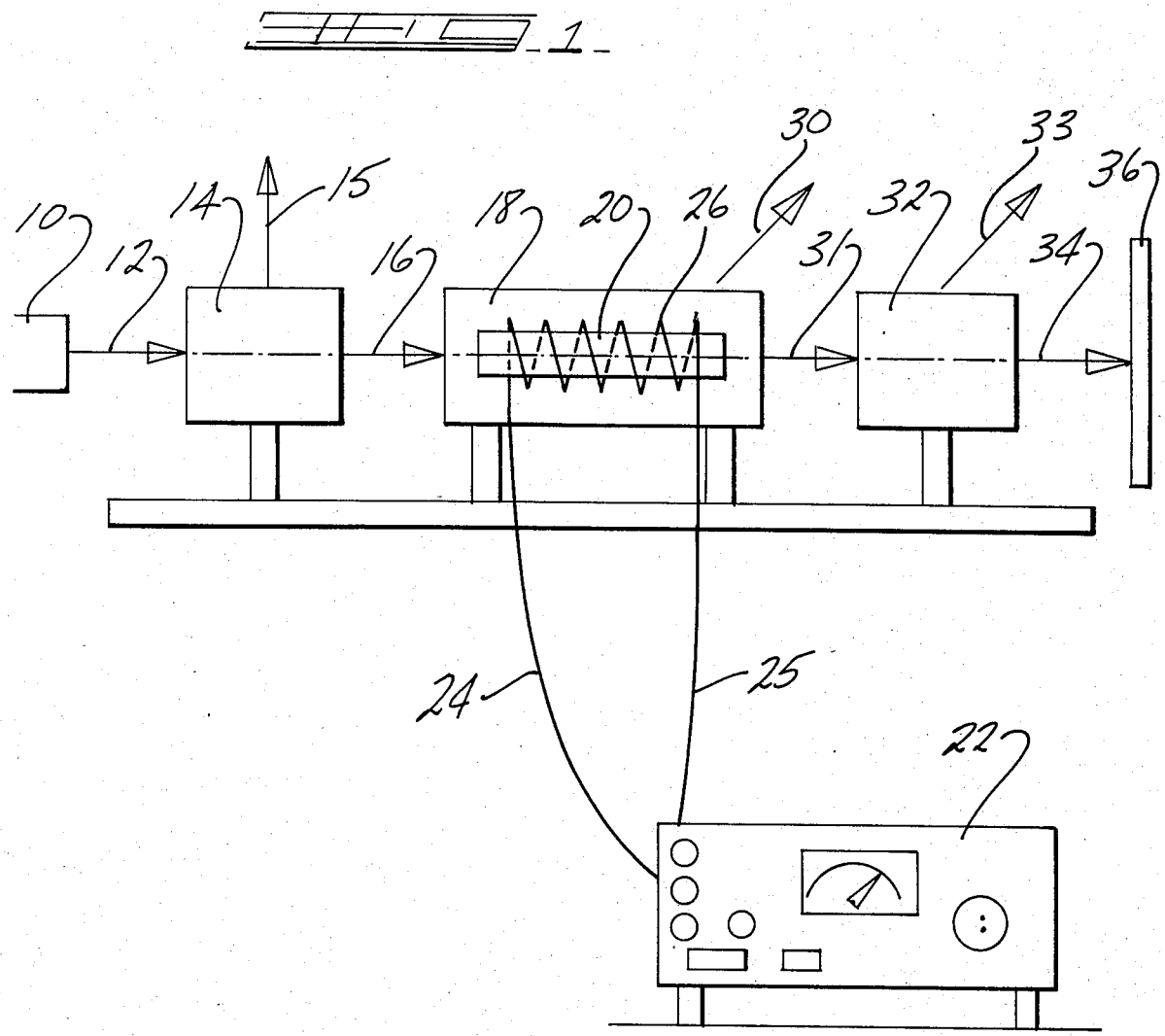

United States Patent
Lee, Jr. et al.

[11] 3,944,329
[45] Mar. 16, 1976

[54] FARADAY ROTATOR DEVICE INCLUDING LITHIA-SILICATE GLASS ARTICLES CONTAINING $Tb_2O_3$ AND METHODS OF USING SAME

[75] Inventors: Haynes A. Lee, Jr., Sylvania; Charles F. Rapp, Toledo, both of Ohio

[73] Assignee: Owens-Illinois, Inc., Toledo, Ohio

[22] Filed: Sept. 16, 1974

[21] Appl. No.: 505,900

Related U.S. Application Data

[62] Division of Ser. No. 318,805, Dec. 27, 1972.

[52] U.S. Cl. ............ 350/151; 106/52; 252/62.51; 252/301.4 F
[51] Int. Cl.² G02B 5/30; C09K 11/08; C03C 3/04; G02F 1/09
[58] Field of Search ..... 106/52; 252/301.4 F, 62.51; 350/151

[56] References Cited
UNITED STATES PATENTS

| | | | |
|---|---|---|---|
| 3,166,673 | 1/1965 | Vickey et al. | 252/62.51 |
| 3,318,652 | 5/1967 | Berger et al. | 252/62.51 |
| 3,471,408 | 10/1969 | Young | 252/301.4 F |
| 3,471,409 | 10/1969 | Lee et al. | 252/301.4 F |
| 3,578,927 | 5/1971 | Roth | 252/301.4 F |
| 3,640,890 | 2/1972 | Lee et al. | 252/301.4 F |
| 3,640,891 | 2/1972 | Lee et al. | 252/301.4 F |
| 3,654,172 | 4/1972 | Reade | 106/52 |
| 3,663,474 | 5/1972 | Lee et al. | 106/52 |

*Primary Examiner*—Winston A. Douglas
*Assistant Examiner*—Mark Bell
*Attorney, Agent, or Firm*—Richard D. Heberling; E. J. Holler

[57] ABSTRACT

There is disclosed a Faraday rotator device suitable for radiation phase shifters, isolators and shutters, that operate in the visible and infrared regions of the electromagnetic spectrum. The device includes (1) means for supplying polarized, electromagnetic radiation, (2) a lithia-silica-terbia glass article capable of effecting Faraday rotation when subjected to a magnetic field, and (3) means for inducing a magnetic field within the glass article, the glass generally comprising about 61–80 mole percent $SiO_2$, 15–27.5 mole percent $Li_2O$, 3–9 mole percent $Tb_2O_3$, and optionally, up to about 3 mole percent of $R_2O_3$, such as $Al_2O_3$ or $B_2O_3$—and optionally, minor amounts of $Na_2O$, $K_2O$ or $CaO$, providing the sum of $Li_2O + Na_2O + K_2O + CaO$ is not substantially greater than about 32.5 mole percent.

22 Claims, 2 Drawing Figures

U.S. Patent   March 16, 1976   3,944,329

FARADAY ROTATOR DEVICE INCLUDING LITHIA-SILICATE GLASS ARTICLES CONTAINING TB$_2$O$_3$ AND METHODS OF USING SAME

This is a division of application Ser. No. 318,805 filed Dec. 27, 1972.

THE INVENTION

This invention relates to optical devices adapted to exhibit large Faraday rotation such as isolators and shutters, operating in the visible and infrared regions of the electromagnetic spectrum. This invention more particularly relates to Faraday rotator devices that include means for supplying polarized electromagnetic radiation, a lithia-silica-terbia glass article capable of effecting Faraday rotation, and magnetic means for inducing a magnetic field in the glass article for rotating the polarized electromagnetic radiation within the glass article.

It is an object of the present invention to provide a Faraday rotator device including means for supplying polarized electromagnetic radiation, a glass article capable of effecting Faraday rotation, magnetic means for inducing a magnetic field in the glass article for rotating the polarized electromagnetic radiation within the glass, the glass article having an unusual balance of desirable properties including a high Verdet constant, good light transmission, good melting properties, high damage threshold, good forming properties including a relatively wide working temperature at approximately log 4 viscosity, being relatively seed-free and being easily homogenized, the glass generally having a composition approximately as follows:

| INGREDIENT | MOLE PERCENT |
|---|---|
| SiO$_2$ | 61–80 |
| Li$_2$O | 15–27.5 |
| Na$_2$O | 0–10 |
| K$_2$O | 0–5 |
| CaO | 0–5 |
| Al$_2$O$_3$ | 0–3 |
| B$_2$O$_3$ | 0–3 |
| La$_2$O$_3$ | 0–3 |
| Tb$_2$O$_3$ | 3–9 | wherein the sum of Li$_2$O + Na$_2$O + K$_2$O + CaO is no greater than about 32.5 mole percent.

It is an object of the present invention to provide a Faraday rotator device that includes a glass article that is capable of effecting Faraday rotation when subjected to a magnetic field, the glass composition comprising, in approximate mole percentages:

| INGREDIENT | MOLE PERCENT |
|---|---|
| SiO$_2$ | 61 |
| Li$_2$O | 27.5 |
| Al$_2$O$_3$ | 2.5 |
| Tb$_2$O$_3$ | 9 |

It is an object of the present invention to provide a Faraday rotator device including a glass article that is capable of effecting Faraday rotation when subjected to a magnetic field, the glass composition containing the approximate mole percentages:

| INGREDIENT | MOLE PERCENT |
|---|---|
| SiO$_2$ | 63.5 |
| Li$_2$O | 27.5 |
| Tb$_2$O$_3$ | 9 |

It is an object of the present invention to provide a method for effecting Faraday rotation of polarized electromagnetic radiation in a glass article, the method including:
1. providing polarized electromagnetic radiation; and
2. inducing a magnetic field within a glass article for effecting Faraday rotation of the polarized electromagnetic radiation within the glass article, the glass article having a glass composition approximately as follows:

| INGREDIENT | MOLE PERCENT |
|---|---|
| SiO$_2$ | 61–80 |
| Li$_2$O | 15–27.5 |
| Na$_2$O | 0–10 |
| K$_2$O | 0–5 |
| CaO | 0–5 |
| Al$_2$O$_3$ | 0–3 |
| B$_2$O$_3$ | 0–3 |
| La$_2$O$_3$ | 0–3 |
| Tb$_2$O$_3$ | 3–9 | wherein the sum of Li$_2$O + Na$_2$O + K$_2$O + CaO is not substantially greater than about 32.5 mole percent.

It is an object of the present invention to provide a method for effecting Faraday rotation of polarized electromagnetic radiation in a glass article, the method including:
1. providing polarized electromagnetic radiation; and
2. inducing a magnetic field within the glass article for effecting Faraday rotation of the polarized electromagnetic radiation within the glass article, the glass article having a glass composition approximately as follows:

| INGREDIENT | MOLE PERCENT |
|---|---|
| SiO$_2$ | 61 |
| Li$_2$O | 27.5 |
| Al$_2$O$_3$ | 2.5 |
| Tb$_2$O$_3$ | 9 |

It is an object of the present invention to provide a method for effecting Faraday rotation of polarized electromagnetic radiation in a glass article, the method including:
1. providing polarized electromagnetic radiation; and
2. inducing a magnetic field within a glass article for effecting Faraday rotation of the polarized electromagnetic radiation within the glass article, the glass article having a glass composition approximately as follows:

| INGREDIENT | MOLE PERCENT |
|---|---|
| SiO$_2$ | 63.5 |
| Li$_2$O | 27.5 |
| Tb$_2$O$_3$ | 9 |

It is an object of the present invention to provide a new use for a glass article in which the glass has the composition approximately as follows:

| INGREDIENT | MOLE PERCENT |
| --- | --- |
| $SiO_2$ | 61–80 |
| $Li_2O$ | 15–27.5 |
| $Na_2O$ | 0–10 |
| $K_2O$ | 0–5 |
| CaO | 0–5 |
| $Al_2O_3$ | 0–3 |
| $B_2O_3$ | 0–3 |
| $La_2O_3$ | 0–3 |
| $Tb_2O_3$ | 3–9 | wherein the sum of $Li_2O + Na_2O + K_2O + CaO$ is no greater than about 32.5 mole percent, the new use including the steps of:
1. placing the glass article in a magnetic field; and
2. directing polarized electromagnetic radiation into the glass article for effecting Faraday rotation of the radiation.

It is an object of the present invention to provide a new use for a glass article in which the glass has the composition approximately as follows:

| INGREDIENT | MOLE PERCENT |
| --- | --- |
| $SiO_2$ | 61 |
| $Li_2O$ | 27.5 |
| $Al_2O_3$ | 2.5 |
| $Tb_2O_3$ | 9 | the new use including the steps of:
1. placing the glass article in a magnetic field; and
2. directing polarized electromagnetic radiation into the glass article for effecting Faraday rotation of the radiation.

It is an object of the present invention to provide a new use for a glass article in which the glass has the composition approximately as follows:

| INGREDIENT | MOLE PERCENT |
| --- | --- |
| $SiO_2$ | 63.5 |
| $Li_2O$ | 27.5 |
| $Tb_2O_3$ | 9 | the new use including the steps of:
1. placing the glass article in a magnetic field; and
2. directing polarized electromagnetic radiation into the glass article for effecting Faraday rotation of the radiation.

It is an object of the present invention to provide a Faraday rotation device that includes a source of light for providing a monochromatic light beam, light polarizing means for polarizing the monochromatic light beam to provide a monochromatic polarized light beam, a glass article capable of effecting Faraday rotation of the monochromatic polarized light beam when subjected to a magnetic field, and magnetic means for inducing a magnetic field for rotating the polarized monochromatic light beam within the glass article, said glass article having a high Verdet constant, good light transmission, good melt properties, high damage threshold, good forming properties including a relatively wide working temperature at approximately log 4 viscosity, being relatively seed-free and being easily homogenized, the glass having a composition approximately as follows:

| INGREDIENTS | MOLE PERCENT |
| --- | --- |
| $SiO_2$ | 61–80 |
| $Li_2O$ | 15–27.5 |
| $Na_2O$ | 0–10 |
| $K_2O$ | 0–5 |
| CaO | 0–5 |
| $Al_2O_3$ | 0–3 |
| $B_2O_3$ | 0–3 |
| $La_2O_3$ | 0–3 |
| $Tb_2O_3$ | 3–9 |

It is an object of the present invention to provide a glass article for a Faraday rotation device, the glass being of the lithia-silica-terbia system, generally comprising about 61–80 mole percent $SiO_2$, 15–27.5 mole percent $Li_2O$, 3–9 mole percent $Tb_2O_3$, and optionally, up to about 3 mole percent of $R_2O_3$, such as $Al_2O_3$ or $B_2O_3$, and optionally, minor amounts of $Na_2O$, $K_2O$ or CaO, providing the sum of $Li_2O + Na_2O + K_2O + CaO$ is not substantially greater than about 32.5 mole percent, the glass having an unusual balance of desirable properties, including a high Verdet constant, high damage threshold, and a relatively wide working temperature range at approximately log 4 viscosity.

Figure 2:
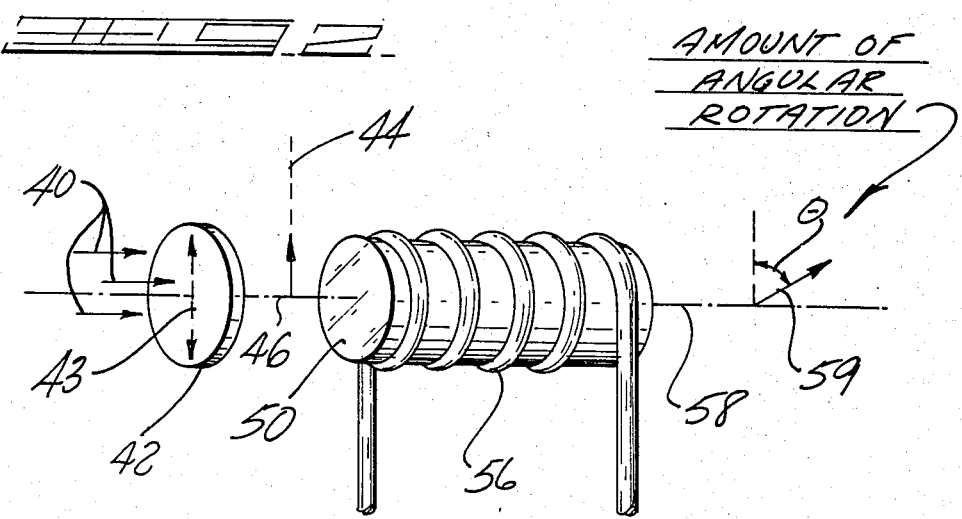

These and other objects will become apparent from the specification that follows, the appended claims and the drawings in which:

FIG. 1 is a diagramatic sketch of a Faraday rotator device of the present invention including means for supplying polarized electromagnetic radiation such as a polarized laser light beam and a glass article made of a glass composition that is generally in the lithia-silica-terbia system that is capable of effecting Faraday rotation when subjected to a magnetic means; and FIG. 2 is a perspective view of a Faraday rotator device showing the glass article capable of Faraday rotation on an enlarged scale compared to FIG. 1, the Figure also showing a source of monochromatic light, a polarizer for the monochromatic light and magnetic means for inducing a magnetic field in the glass for rotation of the polarized monochromatic light passing through the article.

The present invention provides an outstanding Faraday rotator device that includes a glass article made from a composition that is generally in the lithia-silica-terbia system, the glass article having an unusual balance of properties including being capable of effecting Faraday rotation when subjected to a magnetic field and exhibiting a high Verdet constant, having a high damage threshold and having good forming properties including a relatively wide working temperature range at approximately log 4 viscosity, the glass having a composition approximately as follows:

| INGREDIENTS | MOLE PERCENT |
| --- | --- |
| $SiO_2$ | 61–80 |
| $Li_2O$ | 15–27.5 |
| $Na_2O$ | 0–10 |
| $K_2O$ | 0–5 |
| CaO | 0–5 |
| $Al_2O_3$ | 0–3 |
| $B_2O_3$ | 0–3 |
| $La_2O_3$ | 0–3 |
| $Tb_2O_3$ | 3–9 |

The present invention also provides a method for effecting Faraday rotation of a polarized electromagnetic radiation in a glass article, the method including the steps of:
1. providing polarized electromagnetic radiation,
2. inducing a magnetic field within a glass article, the glass article having a glass composition the same as set forth in the previous paragraph, and
3. rotating the polarized electromagnetic radiation as it travels through the glass article.

The present invention also provides an outstanding and new use for a glass article in which the glass has a composition approximately as follows:

| INGREDIENTS | MOLE PERCENT |
| --- | --- |
| $SiO_2$ | 61-80 |
| $Li_2O$ | 15-27.5 |
| $Na_2O$ | 0-10 |
| $K_2O$ | 0-5 |
| CaO | 0-5 |
| $Al_2O_3$ | 0-3 |
| $B_2O_3$ | 0-3 |
| $La_2O_3$ | 0-3 |
| $Tb_2O_3$ | 3-9 | the new use comprising:
1. placing the glass article in a magnetic field; and
2. directing polarized electromagnetic radiation against the glass article for effecting Faraday rotation of the radiation as it travels through the glass article.

The present invention also provides a glass article suitable for a Faraday rotator device, the glass having an unusual combination of desirable properties including a high Verdet constant, good transmission of light and high damage threshold, the glass generally being of a lithia-silica-terbia system containing about 61-80 mole percent of silica, about 15-27.5 mole percent of lithia, and about as low as 3 or 5 up to as high as about 9 mole percent of terbia.

As seen in the drawings, and particularly in FIG. 1, there is shown a Faraday isolator assembly which isolates a laser source from damaging reflections coming back from the target which could destroy the laser. In the particular Faraday rotator device shown in FIG. 1, a monochromatic light source 10 is provided such as a laser beam. A monochromatic light beam 12 is provided from the source 10 and directed to a polarizer 14 where the beam is polarized in the direction indicated by the arrow 15. The beam passes through the polarizer to provide a polarized monochromatic light beam 16, which is directed to a head assembly 18 that houses a generally cylindrical glass rod 20, that is capable of effecting Faraday rotation when subjected to a magnetic field. A magnetic field is provided within the glass rod 20 by means of coils 26 of a solenoid, which is generally wrapped or disposed around the article 20 to induce a magnetic field within the article. A series of capacitors (not shown) are housed in a control unit 22. As is well known in the art, the capacitors are charged by suitable means, and when the capacitors reach a predetermined value, they are discharged to deliver current to the solenoid through electrical lines 24 and 25 which connect the control unit 22 and the coils 26 of a solenoid. Hence, the discharge of the capacitors activates the solenoid, inducing the magnetic field within the article 20. The beam 16, as it travels through the glass article 20, is rotated by the induced magnetic field, the direction of rotation being 45°, as indicated by the arrow 30. A rotated polarized beam 31 emerges from the glass article 20 and is directed through the polarizer 32, which acts as an analyzer. The beam passing through the analyzer is still polarized and oriented 45° in the direction indicated by the arrow 33, which is the same direction as the arrow 30. The resultant analyzed beam 34 in the device shown in FIG. 1, is directed to a target or object 36. Any reflection from the object 36 that is a polarized beam oriented in the direction of arrow 33 travels from the target or object through the polarizer 32. As the reflected beam travels from the polarizer 32 into the glass article 20, the beam is rotated another 45° so that the beam that emerges from the glass article 20 is now 90° out of phase with the polarizer 14. The reflected beam cannot pass through the polarizer 14 and, in this manner, a harmful, reflective beam is prevented from returning to the laser beam source.

As shown in FIG. 2 which is on an enlarged scale with respect to the glass article as compared to the glass article of FIG. 1, a monochromatic light beam 40 as indicated by the arrows 40 is directed into a polarizer 42 whose plane of rotation is indicated by the arrow 43. The light beam passing through the polarizer 42, in the embodiment shown in FIG. 2, is linearly polarized, vibrating in the direction indicated by arrow 44. The polarized beam 46 is directed into a generally cylindrical rod 50 which, in accordance with the present invention, is made of a glass composition having an outstanding balance of properties and being capable of effecting Faraday rotation of the polarized monochromatic light beam 46. The outstanding glass compositions are generally in the lithia-silica-terbia system with optional minor amounts of $R_2O_3$ such as $Al_2O_3$ or $B_2O_3$ and optional minor amounts of $Na_2O$, $K_2O$ or CaO.

A magnetic field is impressed upon the glass article 50 by means of coils 56 of a solenoid, the entering light beam 46 being rotated within the glass and emerging from the exit end of the glass article 50 as a rotated, polarized, monochromatic light beam 58. The orientation of the rotated beam 58 is represented in FIG. 2 by the arrow 59 and the amount of angular rotation is represented by the angle $\theta$.

The outstanding glass article, devices and methods of the present invention are useful in many optical Faraday rotation devices. The disclosures of U.S. Pat. Nos. 3,411,840, 3,420,601 and 3,484,152 are incorporated by reference, such patents disclosing optical Faraday rotation devices including structures thereof and materials useful therein.

The glass composition used for the outstanding glass articles of the present invention can be melted easily and advantageously as, for instance, described in Chapman and LeSueur U.S. Pat. No. 3,656,924 which is hereby incorporated by reference.

Particularly outstanding glass articles are made from preferred compositions in which the compositions are approximately as follows:

| INGREDIENTS | MOLE PERCENT |
| --- | --- |
| $SiO_2$ | 61-71 |
| $Li_2O$ | 20-27.5 |
| $Na_2O$ | 0-5 |
| $K_2O$ | 0-3 |
| CaO | 0-3 |
| $Al_2O_3$ | 0-3 |
| $B_2O_3$ | 0-3 |
| $Tb_2O_3$ | 7-9 | wherein the sum of $Li_2O + Na_2O + K_2O + CaO$ is no greater than about 32.5 mole percent.

Generally, the outstanding glass articles capable of effecting Faraday rotation are of the lithia-silica-terbia system in the following broad and preferred ranges as set forth below:

| INGREDIENTS | MOLE PERCENT BROAD | PREFERRED |
|---|---|---|
| $SiO_2$ | 63.5–80 | 63.5–71 |
| $Li_2O$ | 15–27.5 | 20–27.5 |
| $Tb_2O_3$ | 5–9 | 7–9 |

For most uses such as in a Faraday isolator device, the optimum composition in the ternary lithia-silica-terbia system is about 63.5–64 mole percent $SiO_2$, 27–27.5 mole percent $Li_2O$ and about 9 mole percent $Tb_2O_3$. The lithia silicate system containing an effective Faraday rotational producing amount of $Tb_2O_3$ is greatly preferred over the system employing mixed alkali metal oxides such as even small amounts of $Na_2O$ or $K_2O$ or even an alkaline earth oxide such as CaO. Lithia is needed because of thermodynamic considerations, it being the most stable under the conditions of melting in a platinum lined crucible or melter. Lithia does not enter into a reducing reaction as easily as $Na_2O$ or $K_2O$. Thus the lithia is least likely to be reduced and hence end up attacking the platinum or other noble metal line. Thus, although minor optional amounts of $Na_2O$ and $K_2O$ or CaO can be tolerated for some applications, the decomposition of the oxides $K_2O$ and $Na_2O$ are such that they are more easily reduced than $Li_2O$. While $Na_2O$ is somewhat better than $K_2O$, very little and preferably no other alkali metal oxide usually is a desirable substitute for the $Li_2O$ in the basic lithia-silica-terbia system.

As previously indicated, optional minor amounts of $R_2O_3$ such as $Al_2O_3$, $B_2O_3$ and $La_2O_3$ can be used generally to replace small amounts of $SiO_2$ for certain advantages of chemical durability, etc. and it is preferred that such amounts be kept to a minimum. As indicated, generally a maximum of about 3 mole percent of $Al_2O_3$ and $B_2O_3$ and $La_2O_3$ can be tolerated without seriously detracting from the outstanding balance of properties previously set forth for the glass compositions used to make the outstanding glass articles of the present invention.

The outstanding glass articles, as previously indicated, include elongated bars, rods and discs, such glass articles being easily made generally because of the good melting properties and relatively wide working temperature range in the neighborhood of about log 4 viscosity. Furthermore, as indicated previously, there is an outstanding balance of properties including, quite importantly, a high damage threshold when used in the Faraday rotator device such as shown in FIG. 1. The glass compositions used to make the outstanding articles of the present invention are relatively low melting (having melting points generally in the range of about 2450°–2600°F.) and have a much better (wider) working temperature range than, for instance, alkali free alumino-silicates doped with terbium oxide in which there is substantial amount of aluminum oxide such as in the range of 10–20 weight percent. Generally, the glass compositions used in the working examples have a log viscosity in the range of about 1200°–1220°C. and the log 4 viscosity is in the neighborhood of about 1020°–1030°C.

The following examples are intended to illustrate the invention rather than to limit it in any way.

EXAMPLE 1

Seven glass articles for Faraday rotation were prepared from appropriate batch ingredients as is well known to those skilled in the art. The batch materials which are preferably oxide batch materials were all relatively finely divided. The finely divided particles were thoroughly mixed and placed into a 100% platinum crucible or container for firing generally in a temperature range of about 2450° to 2600°F. for 24 hours with stirring during the melting. A nitrogen atmosphere was employed and a constant flowing nitrogen atmosphere was used to prevent as much as possible contamination from possible platinum inclusions. Gas chromatographic readings were taken to measure the partial pressure of oxygen so as to control the same and prevent any oxides from being reduced to a metal element which might react with the platinum.

The seven compositions employed were as set forth in the table below, all ingredients listed in mole percent:

| INGREDIENTS | 1 | 2 | 3 | 4 | 5 | 6 | 7 |
|---|---|---|---|---|---|---|---|
| $SiO_2$ | 65.5 | 61.0 | 68.5 | 66 | 71 | 66 | 68.5 |
| $B_2O_3$ | 2.0 | — | — | — | — | — | — |
| $Li_2O$ | 23.5 | 27.5 | 20.0 | 20 | 15 | 15 | 20.0 |
| $Tb_2O_3$ | 9.0 | 9.0 | 9.0 | 9 | 9 | 9 | 9 |
| $Al_2O_3$ | — | 2.5 | 2.5 | — | — | — | — |
| CaO | — | — | — | 5 | — | — | — |
| $La_2O_3$ | — | — | — | — | — | — | 2.5 |
| $K_2O$ | — | — | — | — | 5 | — | — |
| $Na_2O$ | — | — | — | — | — | 10 | — |

The resultant molten glass was easily formed into billets or other glass articles including cylindrical rods, elongated bars and discs because, for one thing, the glass composition had a relatively wide working temperature range near or about log 4 viscosity.

The resultant glass articles were annealed generally at a temperature of about 540°C. The annealing process generally included a two week total time period including a slow heat-up and a slow cooling down. A temperature of 540°C. was held for about two days and thereafter the resultant articles were cooled at a rate of approximately 2°C. per hour for about ten days. The resultant articles were tested and used in Faraday rotator devices such as described in the drawings and they were found to be excellent for Faraday rotation of the polarized electromagnetic radiation passed therethrough.

In a similar manner, other glass articles were prepared and tested, the glass compositions including those of the lithia-silica-terbia system previously described as being prepared as well as the optimum ternary lithia-silica-terbia glass composition (63.5 mole percent $SiO_2$, 27.5 mole percent $Li_2O$, and 9 mole percent $Tb_2O_3$) and substantially equivalent results were obtained for most commercial considerations.

What is claimed is:
1. A Faraday rotator device comprising
   1. means for supplying polarized electromagnetic radiation,
   2. a glass article capable of effecting Faraday rotation when subjected to a magnetic field, and

3. magnetic means for inducing a magnetic field in the glass article for rotating the polarized electromagnetic radiation within the glass, said glass article having a high Verdet constant, having good light transmission, having good melt properties, having a high damage threshold, having good forming properties including a relatively wide working temperature at approximately log 4 viscosity, being relatively seed-free and being easily homogenized, said glass having a composition approximately as follows:

| INGREDIENTS | MOLE PERCENT |
|---|---|
| $SiO_2$ | 61–80 |
| $Li_2O$ | 15–27.5 |
| $Na_2O$ | 0–10 |
| $K_2O$ | 0–5 |
| CaO | 0–5 |
| $Al_2O_3$ | 0–3 |
| $B_2O_3$ | 0–3 |
| $La_2O_3$ | 0–3 |
| $Tb_2O_3$ | 3–9 | wherein the sum of $Li_2O + Na_2O + K_2O + CaO$ is no greater than about 32.5 mole percent.

2. A device as defined in claim 1 in which the composition of the glass is approximately as follows:

| INGREDIENTS | MOLE PERCENT |
|---|---|
| $SiO_2$ | 61–71 |
| $Li_2O$ | 20–27.5 |
| $Na_2O$ | 0–5 |
| $K_2O$ | 0–3 |
| CaO | 0–3 |
| $Al_2O_3$ | 0–3 |
| $B_2O_3$ | 0–3 |
| $Tb_2O_3$ | 7–9 |

3. A device as defined in claim 1 in which the glass composition is approximately as follows:

| INGREDIENTS | MOLE PERCENT |
|---|---|
| $SiO_2$ | 61 |
| $Li_2O$ | 27.5 |
| $Al_2O_3$ | 2.5 |
| $Tb_2O_3$ | 9 |

4. A method for effecting Faraday rotation of polarized electromagnetic radiation in a glass article, the method including the steps of
1. providing polarized electromagnetic radiation,
2. inducing a magnetic field within a glass article for effecting Faraday rotation of the polarized electromagnetic radiation within the glass article, in which the glass article has a glass composition approximately as follows:

| INGREDIENTS | MOLE PERCENT |
|---|---|
| $SiO_2$ | 61–80 |
| $Li_2O$ | 15–27.5 |
| $Na_2O$ | 0–10 |
| $K_2O$ | 0–5 |
| CaO | 0–5 |
| $Al_2O_3$ | 0–3 |
| $B_2O_3$ | 0–3 |
| $La_2O_3$ | 0–3 |
| $Tb_2O_3$ | 3–9 | wherein the sum of $Li_2O + Na_2O + K_2O + CaO$ is no greater than about 32.5 mole percent, and 3. rotating the polarized electromagnetic radiation as it travels through the glass article.

5. A method as defined in claim 4 in which the glass composition is approximately as follows:

| INGREDIENTS | MOLE PERCENT |
|---|---|
| $SiO_2$ | 61–71 |
| $Li_2O$ | 20–27.5 |
| $Na_2O$ | 0–5 |
| $K_2O$ | 0–3 |
| CaO | 0–3 |
| $Al_2O_3$ | 0–3 |
| $B_2O_3$ | 0–3 |
| $Tb_2O_3$ | 7–9 |

6. A method as defined in claim 4 in which the glass article has a composition approximately as follows:

| INGREDIENTS | MOLE PERCENT |
|---|---|
| $SiO_2$ | 61 |
| $Li_2O$ | 27.5 |
| $Al_2O_3$ | 2.5 |
| $Tb_2O_3$ | 9 |

7. The new use for a glass article in which the glass has a composition approximately as follows:

| INGREDIENTS | MOLE PERCENT |
|---|---|
| $SiO_2$ | 61–80 |
| $Li_2O$ | 15–27.5 |
| $Na_2O$ | 0–10 |
| $K_2O$ | 0–5 |
| CaO | 0–5 |
| $Al_2O_3$ | 0–3 |
| $B_2O_3$ | 0–3 |
| $La_2O_3$ | 0–3 |
| $Tb_2O_3$ | 3–9 | wherein the sum of $Li_2O + Na_2O + K_2O + CaO$ is no greater than about 32.5 mole percent, the new use comprising the steps of
1. placing the glass article in a magnetic field, and
2. directing polarized electromagnetic radiation into the glass article for effecting Faraday rotation of the radiation.

8. The new use as defined in claim 7 in which the electromagnetic radiation is plane polarized.

9. The new use as defined in claim 7 in which the electromagnetic radiation is circularly polarized.

10. The new use as defined in claim 7 in which the electromagnetic radiation is eliptically polarized.

11. A Faraday rotator device comprising a source of light for providing a monochromatic light beam, light polarizing means for polarizing the monochromatic light beam to provide a monochromatic polarized light beam, a glass article capable of effecting Faraday rotation of the monochromatic polarized light beam when subjected to a magnetic field, and magnetic means for inducing a magnetic field for rotating the polarized monochromatic light beam within the glass article, said glass article having a high Verdet constant, good light transmission, good melt properties, high damage threshold, good forming properties including a relatively wide working temperature at approximately log 4 viscosity, being relatively seed-free and being easily homogenized, the glass having a composition approximately as follows

| INGREDIENTS | MOLE PERCENT |
|---|---|
| $SiO_2$ | 61–80 |
| $Li_2O$ | 15–27.5 |
| $Na_2O$ | 0–10 |
| $K_2O$ | 0–5 |
| $CaO$ | 0–5 |
| $Al_2O_3$ | 0–3 |
| $B_2O_3$ | 0–3 |
| $La_2O_3$ | 0–3 |
| $Tb_2O_3$ | 3–9. | wherein the sum of $Li_2O + Na_2O + K_2O + CaO$ is no greater than about 32.5 mole percent.

12. A device as defined in claim 11 in which there is provided analyzing means for analyzing the rotated polarized monochromatic light beam that travels through the glass article.

13. A device as defined in claim 12 in which the glass composition has the following approximate formulation:

| INGREDIENTS | MOLE PERCENT |
|---|---|
| $SiO_2$ | 63.5 |
| $Li_2O$ | 27.5 |
| $Tb_2O_3$ | 9. |

14. A device as defined in claim 1 in which the glass has the approximate composition as follows:

| INGREDIENTS | MOLE PERCENT |
|---|---|
| $SiO_2$ | 61 |
| $Li_2O$ | 27.5 |
| $Al_2O_3$ | 2.5 |
| $Tb_2O_3$ | 9. |

15. A device as defined in claim 1 in which the glass has a composition approximately as follows:

| INGREDIENTS | MOLE PERCENT |
|---|---|
| $SiO_2$ | 61–80 |
| $Li_2O$ | 15–27.5 |
| $Tb_2O_3$ | 3–9. |

16. A device as defined in claim 1 in which the glass has a composition approximately as follows:

| INGREDIENTS | MOLE PERCENT |
|---|---|
| $SiO_2$ | 61–71 |
| $Li_2O$ | 20–27.5 |
| $Tb_2O_3$ | 7–9. |

17. A device as defined in claim 1 in which the glass has a composition approximately as follows:

| INGREDIENTS | MOLE PERCENT |
|---|---|
| $SiO_2$ | 63.5 |
| $Li_2O$ | 27.5 |
| $Tb_2O_3$ | 9. |

18. A method as defined in claim 4 in which the glass has a composition approximately as follows:

| INGREDIENTS | MOLE PERCENT |
|---|---|
| $SiO_2$ | 61–80 |
| $Li_2O$ | 15–27.5 |
| $Tb_2O_3$ | 3–9. |

19. A method as defined in claim 4 in which the glass has a composition approximately as follows:

| INGREDIENTS | MOLE PERCENT |
|---|---|
| $SiO_2$ | 61–71 |
| $Li_2O$ | 20–27.5 |
| $Tb_2O_3$ | 7–9. |

20. A method as defined in claim 4 in which the glass has a composition approximately as follows:

| INGREDIENTS | MOLE PERCENT |
|---|---|
| $SiO_2$ | 63.5 |
| $Li_2O$ | 27.5 |
| $Tb_2O_3$ | 9. |

21. The new use as defined in claim 7 in which the glass has the approximate composition as follows:

| INGREDIENTS | MOLE PERCENT |
|---|---|
| $SiO_2$ | 61 |
| $Li_2O$ | 27.5 |
| $Al_2O_3$ | 2.5 |
| $Tb_2O_3$ | 9. |

22. The new use as defined in claim 7 in which the glass has the approximate composition as follows:

| INGREDIENTS | MOLE PERCENT |
|---|---|
| $SiO_2$ | 63.5 |
| $Li_2O$ | 27.5 |
| $Tb_2O_3$ | 9. |

* * * * *